(12) United States Patent
Paterson et al.

(10) Patent No.: US 8,949,792 B2
(45) Date of Patent: Feb. 3, 2015

(54) METHODS AND SYSTEMS FOR DATA SERVICE DEVELOPMENT

(75) Inventors: Ian Paterson, Edinburgh (GB); Richard McMahon, Edinburgh (GB); James Boag, Edinburgh (GB)

(73) Assignee: Adobe Systems Incorporated, San Jose, CA (US)

( * ) Notice: Subject to any disclaimer, the term of this patent is extended or adjusted under 35 U.S.C. 154(b) by 908 days.

(21) Appl. No.: 12/542,893

(22) Filed: Aug. 18, 2009

(65) Prior Publication Data

US 2014/0289699 A1 Sep. 25, 2014

(51) Int. Cl.
*G06F 9/44* (2006.01)

(52) U.S. Cl.
USPC ............ 717/124; 717/106; 717/126; 717/168; 714/38.1

(58) Field of Classification Search
None
See application file for complete search history.

(56) References Cited

U.S. PATENT DOCUMENTS

| | | | | |
|---|---|---|---|---|
| 6,092,199 | A * | 7/2000 | Dutcher et al. | 726/4 |
| 6,405,364 | B1 * | 6/2002 | Bowman-Amuah | 717/101 |
| 6,418,466 | B1 * | 7/2002 | Bertram et al. | 709/221 |
| 6,427,000 | B1 * | 7/2002 | Mumford et al. | 379/9 |
| 6,973,643 | B2 * | 12/2005 | Goldsmith et al. | 717/124 |
| 6,990,629 | B1 | 1/2006 | Heaney | |
| 7,079,648 | B2 * | 7/2006 | Griffin et al. | 380/2 |
| 7,233,927 | B1 * | 6/2007 | Norton et al. | 705/67 |
| 7,996,816 | B2 * | 8/2011 | Francis et al. | 717/124 |
| 2003/0037291 | A1 * | 2/2003 | Goldsmith et al. | 714/38 |
| 2003/0084429 | A1 * | 5/2003 | Schaefer | 717/125 |
| 2004/0025083 | A1 * | 2/2004 | Nanja et al. | 714/35 |
| 2004/0117759 | A1 * | 6/2004 | Rippert et al. | 717/100 |
| 2006/0129992 | A1 * | 6/2006 | Oberholtzer et al. | 717/124 |
| 2007/0064943 | A1 * | 3/2007 | Ginter et al. | 380/233 |
| 2008/0147455 | A1 * | 6/2008 | Brunswig et al. | 705/7 |
| 2009/0037893 | A1 * | 2/2009 | Brodsky et al. | 717/154 |
| 2009/0282289 | A1 * | 11/2009 | Nori et al. | 714/38 |
| 2010/0064281 | A1 * | 3/2010 | Kimball et al. | 717/124 |
| 2010/0332535 | A1 * | 12/2010 | Weizman et al. | 707/770 |
| 2011/0264961 | A1 * | 10/2011 | Hong | 714/38.1 |
| 2013/0152047 | A1 * | 6/2013 | Moorthi et al. | 717/124 |

OTHER PUBLICATIONS

"REST Describe," Apr. 26, 2007, available at http://blog.tomayac.de/index.php?date=2007-04-26&time=18:05:54&perma=REST+Describe+first+.html (last accessed May 12, 2009).

(Continued)

*Primary Examiner* — Chameli Das
(74) *Attorney, Agent, or Firm* — Kilpatrick Townsend & Stockton LLP

(57) ABSTRACT

Development of data services can be enhanced through the use of methods and systems that automate aspects of the build process. Particularly, software can be used to automatically generate test cases and incorporate test results into documentation as part of the build process based on an updated Application Programming Interface (API) specification to generate up-to-date and accurate Software Development Kit (SDK) artifacts. A method can comprise accessing data defining an API for a data service, such as Web Application Description Language (WADL) or Web Service Description Language (WSDL) data. The method can further comprise identifying a test case for a service call that can be made via the API based on the data defining the API, and generating test code, the test code configured to evaluate the test case by making the service call. The test code can be used for evaluating the test case(s) in order to ensure requests and/or responses are consistent with the API definition.

20 Claims, 7 Drawing Sheets

(56) References Cited

OTHER PUBLICATIONS

Hadley, "Web Application Description Language" (WADL), Nov. 9, 2006, available at https://wadl.dev.java.net/wadl20061109.pdf (last accessed Jun. 19, 2009).

"Introducing Perforce," Jul. 2009, available at http://www.perforce.com/perforce/doc.091/manuals/intro/intro.pdf (last accessed Aug. 13, 2009).

"Apache Ant User Manual," Date Unknown, available at http://ant.apache.org/manual/index.html (last accessed Aug. 13, 2009).

"CruiseControl Overview," Date Unknown, available at http://cruisecontrol.sourceforge.net/overview.html (last accessed Aug. 13, 2009).

Richard McMahon, Lea Savage, U.S. Appl. No. 12/542,964, titled "Methods and Systems for Managing Data Service Specifications," filed Aug. 18, 2009.

\* cited by examiner

700A

702 FetchArticles
Fetches a list of articles based on a query

704 Example Request
Retrieve stories that match the query "orange":
http://services.example.org/Fetch/Articles?query=orangelogin=username@example.org 706 Example Responses
XML
```
<?xml version="1.0" encoding="UTF-8"?>
<articles count="1" time=123456790>
<article>
<title>
Orange Prices Rising
</title>
<Summary>
```

708 Orange prices continue to go up, worrying orange juice makers.
```
</Summary>
<url="http://articles.example.org/artnum=38422308423422">
<time=5832848280>
</article>
</articles>
```

710 JSON
```
{"articles":[
{
```

712 ```
"link":"http://articles.example.org/artnum=38422308423422,
"time":5832848280,
"summary":"Orange prices continue to go up, worrying orange juice makers."
"title":"Orange Prices Rising"
}]}
```

Figure 7A

FetchArticles
Fetches a list of articles based on a query
Example Request
Retrieve stories that match the query "orange":
http://services.example.org/Fetch/
Articles?query=orangelogin=username@example.orgauthenticationkey=http://
example2.commindate=123456788
Example Responses
XML
<?xml version="1.0" encoding="UTF-8"?>
<articles count="1" time=123456790>
<article>
<title>
Orange Prices Rising
</title>
<BriefSummary>
Orange prices continue to go up, worrying orange juice makers.
</BriefSummary>
<url="http://articles.example.org/artnum=3842230842342">
<time=5832848280>
</article>
</articles>
JSON
{"articles":[
{
"link":"http://articles.example.org/artnum=3842230842342,
"time":5832848280,
"Briefsummary":"Orange prices continue to go up, worrying orange juice makers."
"title":"Orange Prices Rising"
}]}

METHODS AND SYSTEMS FOR DATA SERVICE DEVELOPMENT

TECHNICAL FIELD

The disclosure below generally relates to development of network-based computing resources, particularly to development of data services.

BACKGROUND

Web services and web applications include software systems that support machine-to-machine interaction over a network. For example, a web service or web application may comprise one or more application programming interfaces (APIs) that can be accessed over a network and executed on a remote system hosting the requested service or application. Typically, available functionality is specified in an API and corresponding documentation for use in invoking the web service. For instance, some web services may be defined using the Web Application Description Language (WADL), which is an XML-based format that describes services in a machine-processable way and/or the Web Service Description Language (WSDL), which is an XML format for describing web services, such as by defining ports and messages.

Development of a web service or web application can raise logistical challenges. For example, the web service/application may be developed to include a software development kit (SDK) for clients that includes detailed reference documentation, client libraries for invoking the web service/application in target languages, and sample applications/code. A change to the underlying API can result in a new "build" that entails updating the code that provides the functionality of the service/application, updating the documentation, updating the client libraries, and updating/revising other artifacts. Additionally, testing may be performed to ensure that the service/application as updated actually performs as intended.

SUMMARY

Development of network-based computing resources can be enhanced through the use of methods and systems that automate aspects of the build process. Particularly, one or more software tools can be used to automatically generate test cases and incorporate test results into documentation as part of the build process based on an updated API specification to generate up-to-date and accurate SDK artifacts.

Embodiments of a method can comprise accessing data defining an application programming interface for a data service, such as WADL or WSDL defining some or all aspects of a web service. The method can further comprise identifying a test case for a service call that can be made via the application programming interface based on the data defining the application programming interface, and generating test code, the test code configured to evaluate the test case by making the service call. The test code can be used for evaluating the test case(s), and the method can comprise storing test results in a computer-readable medium.

In some embodiments, a method can comprise generating, based on the data defining the application programming interface, at least one client library comprising code for making the service call. The test code to evaluate the test case can be generated so that, when executed, functionality provided via the client library is used to make the service call. Evaluating the test case can comprise determining if, when used, the code of the client library makes a request that meets requirements for a request as specified in the data defining the application programming interface.

For example, an HTTP GET request generated by the library can be evaluated to ensure the request is not inconsistent with the API specifications. Additionally or alternatively, evaluating the test case can comprise determining if the data service provides output that meets requirements for a response as specified in the data defining the application programming interface. In some embodiments, a documentation template can be identified and used to produce a reference document by inserting at least a portion of the code of the client library into the documentation template.

In some embodiments, a method comprises storing a wiretrace, the wiretrace comprising data sent to the data service and received from the data service while the test case is evaluated. As an example, the wiretrace can include HTTP requests and responses captured prior to any encryption used in communicating with the service. At least some of the wiretrace can be included in documentation in addition to or instead of code. The client libraries, documentation, and/or other artifacts can be included in a software development kit (SDK) that may enhance the development experience for developers of client applications for accessing the data service.

Embodiments include computing systems and computer-readable media comprising program code for providing aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIGS. 7A-7B illustrate examples of documentation for a data service.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
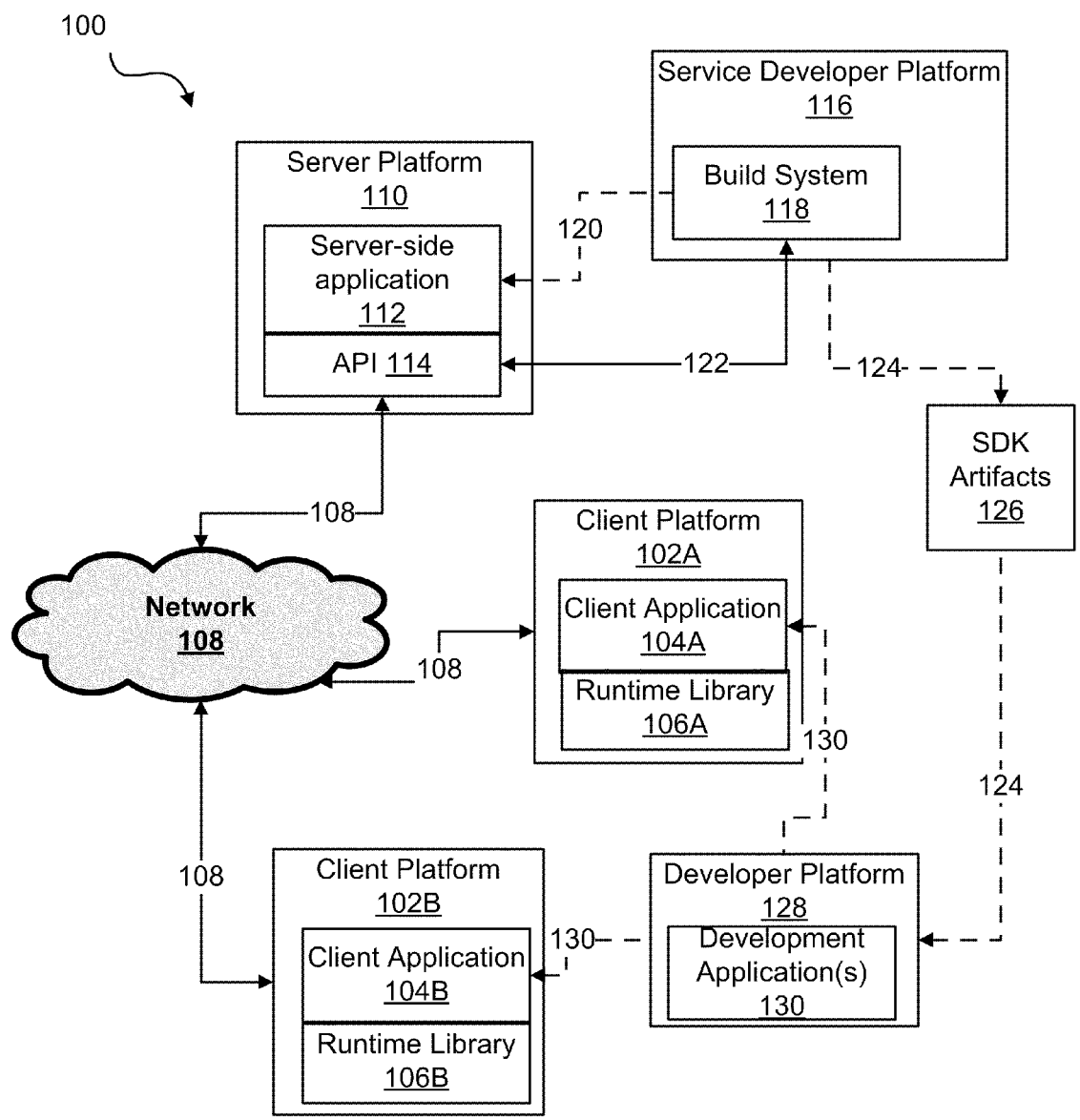
FIG. 1 is a diagram illustrating an exemplary development and use environment for a data service.

FIG. 1 is a diagram illustrating an exemplary development and use environment 100 for a data service. In this example, a plurality of client computing platforms 102A, 102B utilize respective client applications 104A, 104B and corresponding runtime libraries 106A, 106B to access a data service provided by server computing platform 110 via one or more networks 108. Each computing platform may, for example, comprise one or more processor-based computing devices. The client computing platforms are "clients" with respect to the data service; for instance, the clients may be devices used by one or more users or may comprise servers that are themselves providing another data service that relies on functionality provided by the data service available from computing platform 112.

The data service may, for example, comprise a web service provided by one or more server-side applications 112 whose functionality is invoked via application programming interface (API) 114. For instance, the web service may be implemented as a representational state transfer (REST) architecture in which the clients provide calls to remote methods via HTTP requests that can include one or more (and typically several) parameters using a format specified in documentation for API 114. In response, server-side application(s) 112 can return responses using a structure/format also specified in documentation for API 114 or elsewhere. Although a single API is illustrated for the sake of simplicity, a data service may implement any number of APIs.

In this example, client platforms 102A and 102B utilize respective client applications 104 and runtime libraries 106 to invoke the web service. As an example, client application 104A and runtime library 106A may represent an implementation based on the Ruby programming language, while client application 104B and library 106B may represent an implementation based on the ActionScript programming language. This example depicts libraries 106 at clients 102. For example, the libraries 106 may be maintained separately (e.g., dynamically linked at runtime). However, in some embodiments, libraries 106 may or may not reach clients 102-for example, a library 106 may be incorporated into a client application 104 at the time of development and thus may not be separately provided to a client.

The entity or entities that provide the web service may utilize one or more service development platforms 116 to execute one or more applications, programs, or components collectively illustrated as build system 118 to create and maintain the server-side application(s) 112 that provide the web service functionality. This is conceptually illustrated by dotted line 120. Service development platform 116 may comprise the same server or a different server that actually executes server-side application(s) 112. In some embodiments, the web service provider may specify the functionality of the web service via WADL or WSDL as noted above. Build system 118 can be used to automatically generate suitable code for providing server-side application(s) 112 based on the WADL, WSDL, or other specification data.

In accordance with one or more aspects of the present subject matter, build system 118 can also be used to generate code to test aspects of server-side application(s) 112. Thus, connection 122 is illustrated to represent build system 118 invoking the functionality of server-side application 112 via API 114 by running test code. In practice, build system 118 may perform tests using a separate test build of the web service rather than the "production" version (if any).

To facilitate the development process, build system 118 may also be configured to provide software development kit (SDK) artifacts 126 for use by developers. This is conceptually illustrated by dashed lines 124 leading to developer platform 128, although developer platform 128 may use network 108 to actually receive the artifacts. Developer platform 128 represents one or more computing devices configured using suitable development application(s) 130. For example, a development application 130 may comprise an integrated development environment (IDE) such as the Eclipse® development application. As another example, development application 130 may comprise a web authoring tool such as Adobe® Dreamweaver® or Fireworks® used to develop a client application 104 implemented as a web page or plugin.

In this example, as illustrated by dashed lines 130, developer platform 128 is used to provide both client applications 104A and 104B. In practice, many different client-side developers may rely on SDK artifacts provided by web service developers to develop different types of client applications. For example, in another embodiment client application 104A is a standalone application for accessing the web service and is developed by a first developer while client application 104B is a web page or plugin for accessing the web service and is developed by a second developer.

SDK artifacts 126 can include runtime libraries 106 for one or more languages to facilitate the development process for distribution with client applications 104 for use at runtime and/or for use by developers writing standalone client applications 104. Additionally, API documentation can be included to define the web service in terms of input and output parameters and syntax. Finally, additional reference documentation can be provided that includes sample code and sample input/output data ("wiretraces" below).

The sample code and wiretraces may be of particular use to client-side developers since, ideally, the sample code and wiretraces represent a solid example of how to invoke functionality of the data service. For example, a developer may be able to use a segment of sample code and make minor or no adjustments rather than completely write code from scratch. This ease of development facilitated by a robust SDK may be an important factor in the success of the web service.

However, as a project evolves, conventionally-managed sample code and wiretraces may not always keep up with updates to the service and thus may not always be truly compatible with the latest version of a data service. For example, after a change to the API documentation and sample code may no longer properly illustrate how to use the web service. This issue can be multiplied when a web service is intended for use with multiple different client-side programming language—each client library may require adjustment, for example. Embodiments configured in accordance with the present subject matter, on the other hand, may advantageously provide up-to-date artifacts such as sample code and wiretraces as part of the build process as noted further below.

Figure 2:
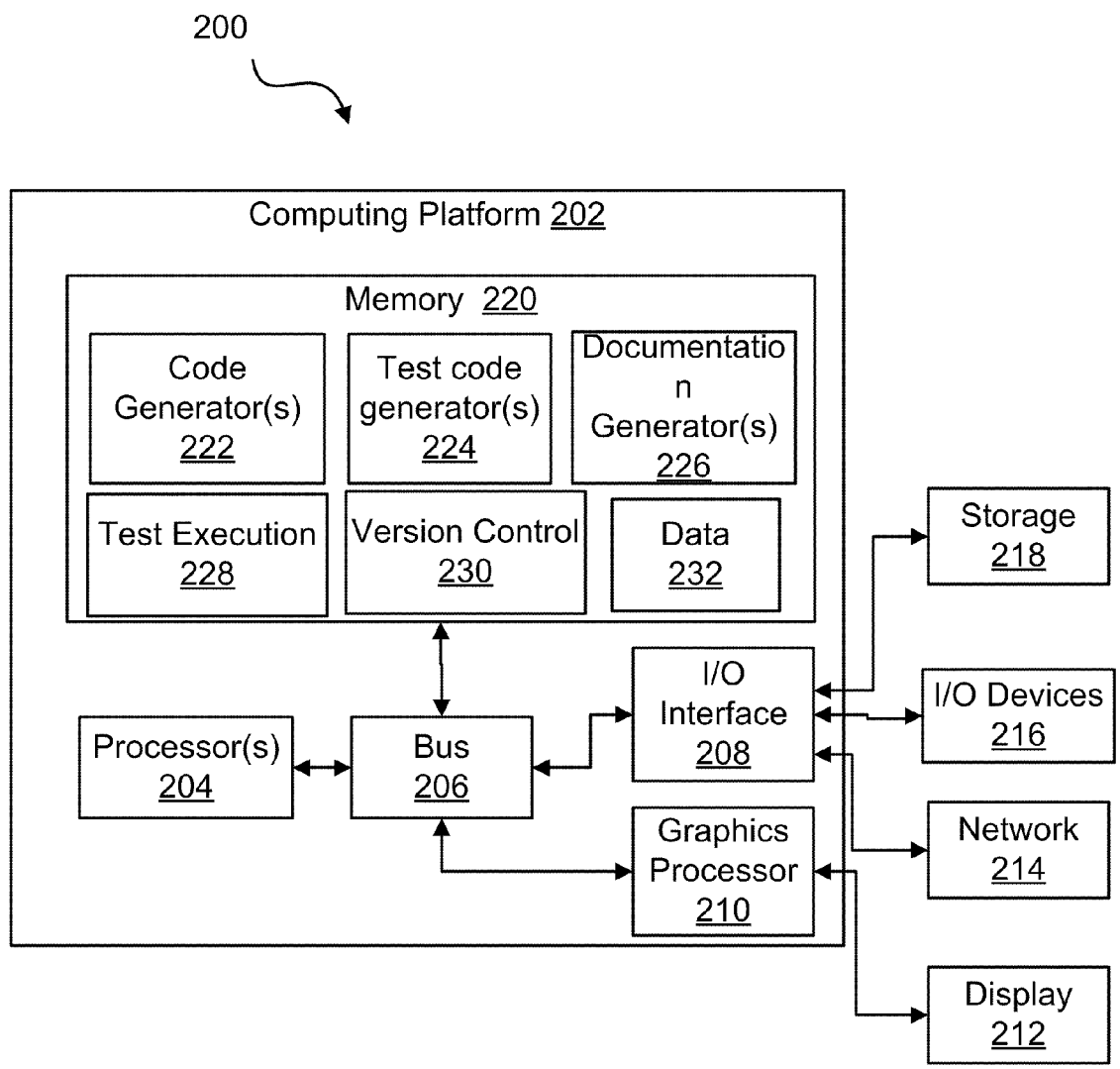
FIG. 2 is a diagram illustrating an example of a computing device configured by software components to provide a SDK build system.

The computer platforms of FIG. 1 may comprise computing devices with one or more processors configured by software tangibly embodied in computer-readable media (e.g., memory) accessible to the processor(s). FIG. 2 provides an example of a computing platform 200 configured to provide a build system but a similar hardware architecture can be used for any or all of client platforms 102, server platform 110, and developer platform 128.

Computing platform 202 comprises one or more processors 204 connected via a bus 206 to a memory 220. Additionally, bus 206 is connected to I/O interface 208 and graphics processor 210. Graphics processor 210 drives one or more displays 212 that can be used to view output of computing platform 202. 1/0 interface 208 provides connections to networking components 214 (e.g., local area and/or wide-area connections), I/O devices 216 (e.g., mouse, keyboard, speakers, and other input and output devices), and storage 218 (e.g., computer-readable media such as disk drives).

Memory 220 represents local and/or remotely-accessible storage such as RAM. In this example, a build system is embodied in memory and comprises a plurality of components. Particularly, the build system includes code generator module(s) 222, test code generator module(s) 224, documentation generator module(s) 226, test code execution module(s) 228, version control module(s) 230, and data 232. Data 232 can include both data used to drive the build process (e.g., WSDL, WADL, and/or other specification data) as well as output code, test case results, and executable files.

Memory 220 may include additional components and applications such as an operating system and the like. In this example, the build system is depicted as locally hosted with respect to I/O devices 216 and display 212. However, in some embodiments, the build system is hosted on one or more servers interfaced to workstations that handle input/output tasks.

Figure 3:
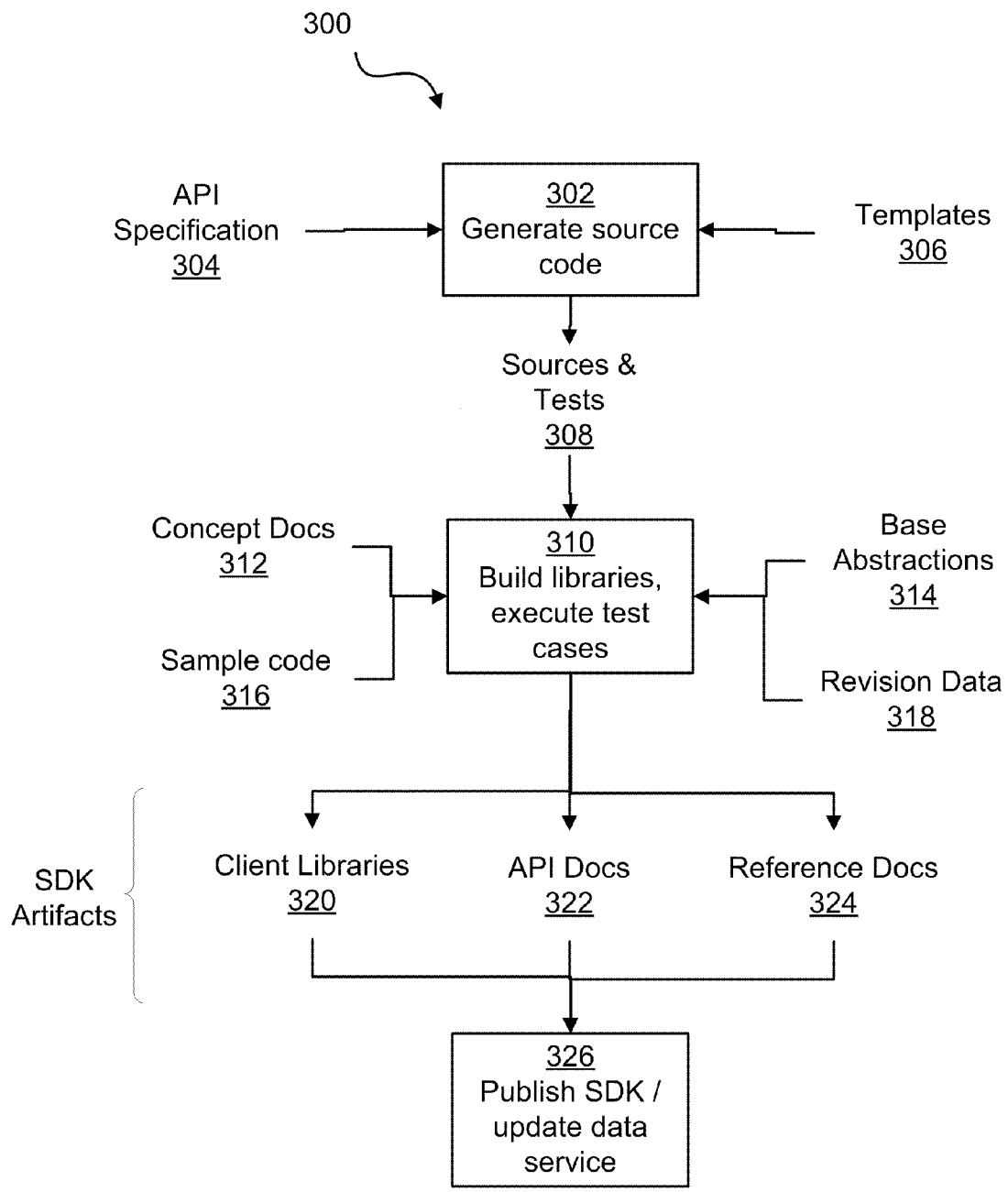
FIG. 3 is a flow diagram illustrating an example of a build process in accordance with aspects of the present subject matter.

FIG. 3 is a flow diagram 300 illustrating an example of a build process in accordance with aspects of the present subject matter and will be discussed in conjunction with the modules of the build system depicted in FIG. 2. However, the particular division of functionality across the modules is not intended to be limiting. For instance, one or more modules may each comprise one or more separate applications or components in some embodiments, while in some embodiments the modules comprise components within one large application or package that includes still further functional components.

Block 302 represents a code generation step. For example, block 302 can include use of the WADL, WSDL, or other API specification data 304 to generate source or executable code for actually providing the web service functionally as is known in the art. However, in accordance with the present subject matter, the API specification data 304 can be used in conjunction with one or more templates 306 to generate output 308 that includes source code for generating client libraries and code for generating test cases. The test cases can be used to ensure that the client libraries provide proper requests to the service and/or to ensure that the service responds in a manner consistent with the API specification.

As a particular example, portions of the API specification relating to input parameters and input structures may be changed by adjustments to a portion of a WADL file in some embodiments. Version control module 230 may detect the change and trigger a new build process by using code generator module 222 to parse the API specification in order to generate a set of request and response-based source code classes included in output 308 for use by clients in handling network connections, marshalling parameters, and validating returned data. The classes can be generated based on adjusting templates 306 to match the API specification 304.

For instance, different classes may be generated for interacting with different client-side languages to be supported by the web service by reference to corresponding templates 306.

As an example, a respective set of classes may be generated for each of Java, Actionscript, Ruby, PHP, C++, and/or other languages to be supported by the web service. The generated classes may assume the presence of base abstractions 314 provided manually, such as basic classes for receiving/defining requests, responses, etc. in each language.

In accordance with the present subject matter, output 308 further includes test code for automatically evaluating the functionality of the web service and libraries based on the WADL, WSDL, or other API specification data. For instance, test code generator(s) 224 can evaluate calls to the web service as defined in API specification data 304 to identify which parameters are required and which parameters are optional for particular service calls to the web service and generate code for making the calls via the generated libraries.

As one example, as will be noted below, if five parameters are required, the test code can include six test cases, with one (valid) test case providing all five parameters and five (invalid) test cases each omitting a respective one of the parameters to ensure that the valid request is honored and the invalid requests are treated properly. The test code can also include appropriate source code for initializing test fixtures (e.g., a dummy account to test login activity) and removing the test fixtures once the test is complete. More complex permutations of test parameters can be generated in some embodiments. For example, if a call requires either of two parameters, a test case can be included to determine if the call fails if both parameters are provided and to determine if the call works when either parameter is used without the other.

The source code classes and test code output 308 can be used during build step 310 to generate SDK artifacts 320, 322, and 324 that track the most recent changes and/or additions to the API. For example, the source code classes of output 308 can be used along with base abstractions 314 to compile a respective client library 320 for each supported language by a suitable compiler included in or accessible to the build system. API documentation 322 can be generated by documentation generator module 226 based on the API specification data to include a description of each service call along with required parameters, formatting information, and the like. Documentation generator module 226 may use concept source documents 312 and code samples 312 to package reference documentation 324 for inclusion in the SDK as well.

Build step 310 can also include execution of the test code included in source and test code output 308. For instance, test execution module 228 may compile the client libraries and use the test code to invoke the latest version of the web service via the libraries. Test execution module 228 can evaluate the test results and store test output and results for use by the web service development team.

In accordance with aspects of the present subject matter, test execution module 228 can be configured in some embodiments to generate wiretraces for inclusion in reference documents 324 by document generation module 226. For example, as each test case is performed, test execution module 228 can track data provided to the web service and data returned from the web service when a particular call is made to the service. Document generation module 226 can identify a tag or other indicator corresponding to the call in conceptual documents 312 and dynamically insert the wiretraces at the appropriate location.

Document generation module 226 may additionally be configured to insert updated sample code in reference documents 324. For example, a tag or other indicator corresponding to a particular call to the web service can be identified in the conceptual documents 312 and snippets from the client libraries that were used to invoke the test cases can be included for easy reference by developers. This insertion may be contingent upon a test execution module 228 identifying that the test result was successful. Accordingly, the development team can be confident that reference documents 324 contain up-to-date test code that actually can be used in conjunction with the web service. In some embodiments, publication of the SDK artifacts (e.g., to a web site or other distribution portal) can be contingent upon passing all tests to ensure that the published SDK is valid against the service it was tested against.

Document generation module may also update API documents 322. For example, concept docs 312 may include a framework for generating API documentation, such as a series of headers, basic descriptive text, and navigational structure with tagged placeholders for inserting API information. Using the API specification data, document generation module can create suitable API information for insertion. For example, for each service call, a tables or other logical structure with a row corresponding to each input parameter for that service call can be generated. The table may include space for a technical writer to insert text; however, API documentation 322 may simply comprise a listing of available service calls and parameters, with more detailed documentation included in reference docs 324.

Block 326 represents publishing the SDK artifacts for distribution. For example, version control module 220 can include a file transfer protocol (FTP) application to upload the SDK artifacts to a server at a suitable location. For example, version control module 320 may place updated SDK artifacts for each supported language in a folder corresponding to the language and nested in a folder corresponding to the presently-active version of the web service. If the build process also includes generation of code for providing the web service, version control module 220 may also upload suitable code for providing the latest version of the web service.

In some embodiments, a new build is triggered by detecting a change in API specification 304. However, the change may affect only part of the web service. For instance, a change may be specified for only one supported language, or only a subset of service calls may be adjusted. Revision data 318 can be used to control build step 310 to avoid re-building and/or re-testing unchanged components. For example, if a change affects only one of several supported languages, then only the SDK artifacts for that language can be updated. Similarly, of only certain service calls are updated, then SDK artifacts for those service calls can be generated while SDK artifacts pertaining to unchanged calls can simply be re-used in the latest version.

Figure 4:
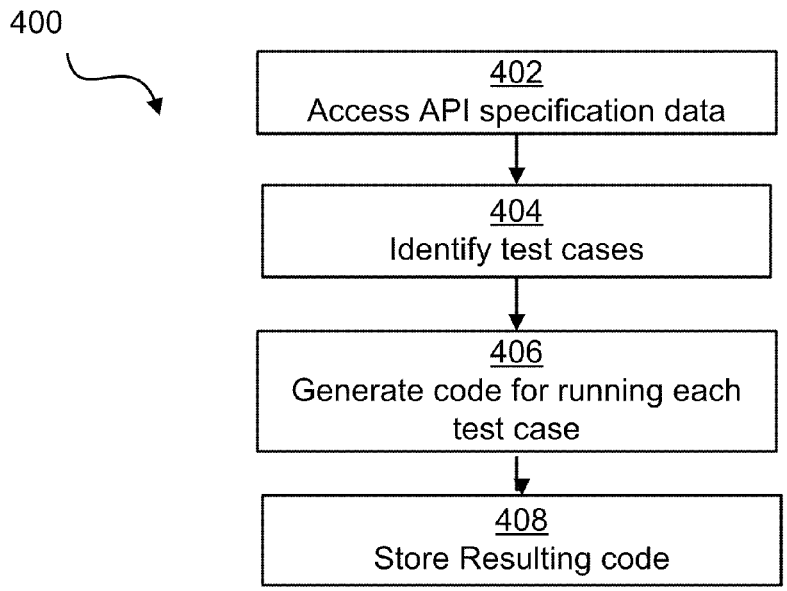
FIG. 4 is a flowchart illustrating steps in an exemplary method for generating code for test cases.

FIG. 4 is a flowchart illustrating steps in an exemplary method 400 for generating code for test cases. At block 402, API specification data is accessed and at block 404 test cases are identified. For example, XML-formatted data such as WADL or WSDL as mentioned above can be accessed and parsed to identify web service calls and the input parameters associated with each call.

In some embodiments, for each call, a test case is generated to test invoking the service call for each permutation of fewer than all parameters and a test case is generated to test invoking the call with all required parameters. Thus, block 404 can include identifying the service calls to be tested and, for each call, identifying required and optional parameters and determining permutations of the parameters to test. At block 406, code for running each test case is generated and at block 408 the code is stored for use by the build system.

For instance, if five parameters are identified as "required" for a service call, then six test cases for that call will be generated—five test cases, each missing one of the required parameters, and one test case providing all the with one of each required parameter absent and a test case is generated to invoke the call. Test cases can also be generated to test the functionality of optional parameters—for instance, for each optional parameter, a test case for invoking the call using the required parameters plus the optional parameter can be generated.

Generating code for running each test case can also include generating code for setting up and removing "test fixtures" in some embodiments. A "test fixture" refers to supporting infrastructure for running a test. As an example, to test a login service call, a user account with the web service should be put in place prior to running the test so that a username and password (and/or other info) included in the test will actually invoke the service. When the test is completed, the user account should be removed. As another example, invoking a service call to remove or edit a file at the web service assumes the existence of the file.

Suitable templates can be prepared by developers for use in setting up and removing test fixtures and can be made available to the build system. For example, a developer may provide a template that includes a class or method for setting up a dummy account, populating a file store, or otherwise establishing test data for a service to work with. The usernames and passwords can be generated to be unique or almost unique, such as by including large random numbers as components of the names. When generating test cases, the build system can reference the template in order to reference a usable username, file, or other parameter.

Figure 5:
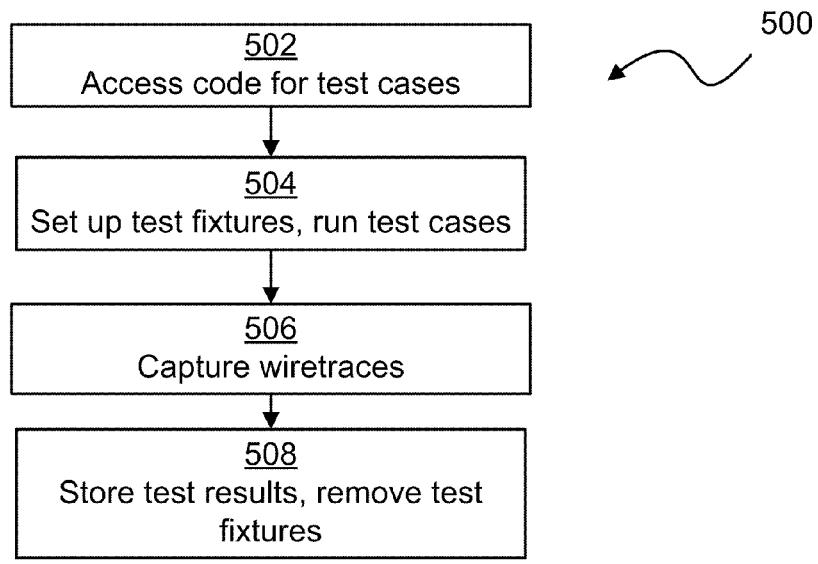
FIG. 5 is a flowchart illustrating steps in an exemplary method for executing test cases.

FIG. 5 is a flowchart illustrating steps in an exemplary method 500 for executing test cases. At block 502, previously-generated code for the test cases is accessed and executed at block 504 to invoke the functionality of the web service via the client libraries.

For example, one or more executable files including test code and fixture setup/removal code can be run by a test orchestrator such as test execution module 228 of FIG. 2. For instance, each test case for each service call can be executed in turn by invoking the functionality of the client library (libraries) under test and passing appropriate parameters from the test code, with each test case executed between suitable fixture setup and removal.

Block 506 represents capturing wiretraces during each test case. For example, test execution module 228 may monitor serialized input, such as HTTP GET requests or other data provided by the executing test code to the web service. Data returned from the web service can be recorded and stored at block 508 in a suitable location indexed to the test case and serialized input from the test code. In some embodiments, recording of data sent to and from the web service is enabled via code included in the client libraries. This can allow access to data for transactions that could not be reached using normal wiretrace components—for example, transactions make take place over an SSL channel. By recording from the actual client-side components, the wiretrace data can be captured prior to encryption or after decryption.

Once the test case is complete, then the test fixtures for that case can be removed. For instance, if a test case required use of a user account with a login name and password, the user account can be deleted once the test case is complete.

Once the returned data is available, the data can be compared against the required response as specified in the API documentation. For example, if the response uses a particular XML format, then the response can be validated to ensure it adheres to a schema specified in the API documentation. The request(s) provided by the client library (libraries) under test can also be checked to ensure the behavior of the client library is not inconsistent with the API specification.

For example, the test code may pass all required parameters for a particular service call to the client library, but the client library may not include all the required parameters in a request. This error condition can be determined by evaluating the request provided by the client library against the API specification for the service call in question. As another example, the syntax used by the client library can be evaluated to ensure the syntax matches that specified in the API, and any result handlers of the client library can be checked to ensure the client library has the proper infrastructure to receive all data provided by the data service in response to the request. Other test conditions can be evaluated—for example, the API may specify a certain range for parameters, order of parameters, and the like. Types and restrictions of API parameters (both input parameters and output parameters) can be specified in a standard notation such as an XML schema document.

The test execution module can provide reports or other suitable output for use by a development team in assessing test results. For example, if a library does not provide properly-formed requests and/or the data service does not provide expected output for a particular test case, an exception message can be provided identifying the service call, client library, and other test case information. The build process may be suspended or discontinued if an error is found to avoid generation of an incomplete SDK.

In some embodiments, the test fixtures can be set up prior to running a plurality of test cases and then removed once all test cases are complete. However, setting up test fixtures and removing test fixtures on a case-by-case basis as noted in the example above may benefit the testing process by reducing the possibility of one test case influencing the results of another test case.

Figure 6:
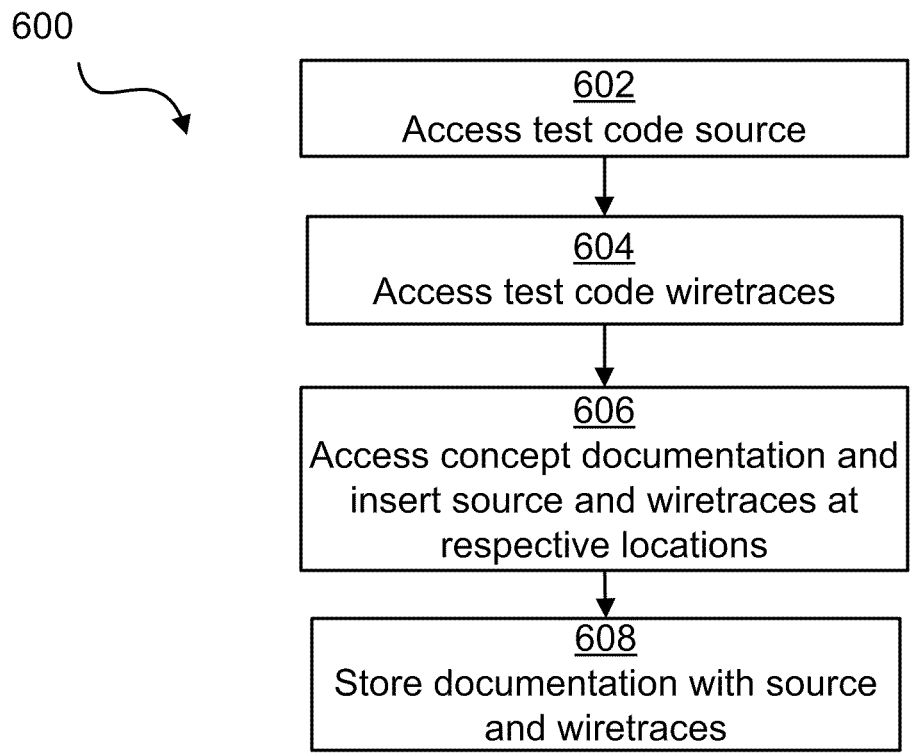
FIG. 6 is a flowchart illustrating steps in an exemplary method for updating documentation.

FIG. 6 is a flowchart illustrating steps in an exemplary method 600 for updating documentation based on the build process. At block 602, the test code source for at least one test case for each service call and corresponding source code from the library (libraries) used in the testing process is accessed and at block 604 the corresponding wiretrace for each case is accessed. For instance, the test code source and wiretrace for the "valid" test case that provides all required parameters can be accessed for each service call for inclusion in the SDK documentation.

Block 606 represents inserting test code and wiretraces into respective portions of the SDK documentation and at block 608 the updated documentation is stored. For example, syntax for invoking a particular service call via an HTTP GET request can be provided along with examples of output in one or more formats can be inserted into respective locations in an HTML page for the service call as noted below. The conceptual documents may include headers and descriptive text along with tags that identify where code snippets and wiretraces are to be embedded. During the document generation process, the corresponding code snippets and wiretraces can be accessed and inserted inline based on locating the tags.

FIGS. 7A-7B illustrate examples of a documentation page 700 for a call to data service. For example, each page 700 may represent an HTML or other page in a collection of respective pages in the documentation. Portions 702, 706, and 710 represent text included in conceptual documentation, while portions 704, 708, and 712 in FIG. 7A and portions 714, 716, and 718 in FIG. 7B represent code and wiretrace data inserted into the documentation by the build system.

For example, page 700A can represent documentation for a "FetchArticles" service call. In this example, portion 702 include as brief description of the FetchArticles service call while portions 706 and 710 represent headers for identifying examples of output. In this example, portion 704 represents an http request inserted into the documentation based on an http request sent during testing.

For instance, API documentation for an initial build of the service may specify the listed URL (http://services.example.org) and syntax (/Fetch/Articles) for invoking the service, along with two required parameters: a query ("orange") in this example, and a login (usuername@example.org).

Based on these required parameters, code for invoking the FetchArticles service may have been generated and executed during the build process. In this example, the testing resulted in XML and JSON output that was captured as a wiretrace and is inserted into the documentation at 708 and 712.

FIG. 7B represents an updated page 700B based on changes to the service API. In this example, changes were made both in the required parameters and in the output format. Particularly, an "authenticationkey" parameter pointing to a certificate or other identifier is required to invoke "FetchArticles." Based on wiretrace data from updated test cases, portion 714 has been inserted to replace portion 704 of FIG. 7A.

In this example, the output format was also changed to rename "Summary" in the returned data to "Brief Summary." This change has propagated through the build process to the test cases and resulting wiretraces and is automatically represented in the documentation.

In some embodiments, the documentation can also include source code used to generate the example request. For instance, as was noted above, the build process can include generating client libraries for invoking the data service and the testing process can include validating the functionality of the client libraries. As an example, a Java and Ruby client library may have been generated by the build system, compiled, and tested to ensure that the respective libraries generate a proper http GET request for invoking the FetchArticles service.

The respective portions of the libraries used to generate the GET request can be included at appropriate points in the documentation. For example, pages 700A and 700B may include an additional field titled "Java Code" and "Ruby Code" with the portions of the Java and Ruby libraries used to generate the GET request beneath the corresponding fields. Rather than using the code exactly as generated in the test case, portions of code based on the code for the test case can be used—for example, particular parameter values (e.g., user names, queries) and code related to producing wiretraces can be omitted.

The examples above are not meant to be limiting, and embodiments of a software development kit build system can support any number or type of programming language. The build infrastructure noted above may be extensible to a new programming language by supplying appropriate base abstractions, templates, and updating conversion coding for parsing the API specification and writing client libraries in the new language.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
   accessing data defining an application programming interface for a data service;
   identifying a test case for a service call specified by the application programming interface based on the data defining the application programming interface, wherein the test case comprises a plurality of required parameters for the service call;
   identifying an additional test case for the service call, wherein the additional test case comprises a subset of parameters that includes fewer than all of the plurality of required parameters for the service call;
   automatically generating test code from code in at least one client library, the test code including at least one function for evaluating the identified test case by making the service call using the plurality of required parameters and code for evaluating the additional test case by executing the at least one function using the subset of parameters;

automatically evaluating the identified test case, wherein evaluating comprises executing the at least one function in the test code and storing test results in a non-transitory computer-readable medium; and updating the code in the at least one client library that corresponds to the test code based at least in part on the test results from evaluating the identified test case.

2. The method set forth in claim 1, further comprising generating, based on the data defining the application programming interface, the at least one client library comprising code for making the service call, wherein the test code to evaluate the test case is generated so that, when executed, functionality provided via the at least one client library is used to make the service call.

3. The method set forth in claim 2, wherein the test results indicate whether execution of the code of the at least one client library generates a request that meets requirements specified in the data defining the application programming interface.

4. The method set forth in claim 2, further comprising:
identifying a documentation template; and
producing a reference document by inserting at least a portion of the code of the at least one client library into the documentation template.

5. The method set forth in claim 4, further comprising inserting a wiretrace that corresponds to the portion of the code of the at least one client library into the documentation template, the wiretrace comprising data sent to the data service and received from the data service while the test case is evaluated, wherein the data is sent to and received from the data service by executing the test code.

6. The method set forth in claim 1, wherein evaluating the test case comprises determining if the data service provides output that meets requirements for a response as specified in the data defining the application programming interface.

7. The method set forth in claim 1, wherein evaluating the test case comprises capturing a wiretrace by recording data sent to the data service and data received from the data service while the test case is evaluated and caused by executing the test code.

8. The method set forth in claim 7, further comprising:
identifying a documentation template; and
producing a reference document by inserting at least some of the data of the wiretrace into the documentation template.

9. The method set forth in claim 1, wherein generating the test code further comprises generating test user account information that corresponds to the test case.

10. The method set forth in claim 9, further comprising removing the test user account information that corresponds to the test case in response to completing evaluation of the test case.

11. The method of claim 1, wherein the test case is identified and the test code is automatically generated in response to detecting a change to the data defining the application programming interface.

12. A non-transitory computerreadable medium tangibly embodying program code, the program code comprising:
program code for accessing data defining an application programming interface for a data service;
program code for identifying a test case for a service call specified by the application programming interface based on the data defining the application programming interface, wherein the test case comprises a plurality of required parameters for the service call;
program code for identifying an additional test case for the service call, wherein the additional test case comprises a subset of parameters that includes fewer than all of the plurality of required parameters for the service call;

program code for automatically generating test code from code in at least one client library, the test code including at least one function for evaluating the identified test case by making the service call using the plurality of required parameters and code for evaluating the additional test case by executing the at least one function using the subset of parameters;

program code for automatically evaluating the test case by executing the at least one function in the test code and storing test results; and program code for updating the code in at the at least one client library that corresponds to the test code based at least in part on the test results from evaluating the identified test case.

13. The non-transitory computer-readable medium set forth in claim 12, further comprising:
program code for generating, based on the data defining the application programming interface, the at least one client library comprising code for making the service call,
wherein the code to evaluate the test case is generated so that, when executed, functionality provided via the at least one client library is used to make the service call.

14. The non-transitory computer-readable medium set forth in claim 13, wherein evaluating the test case comprises at least one of:
determining if, when used, the code of the at least one client library makes a request that meets requirements for a request as specified in the data defining the application programming interface; or
determining if the data service provides output that meets requirements for a response as specified in the data defining the application programming interface.

15. The non-transitory computer-readable medium set forth in claim 13, further comprising:
program code for identifying a documentation template and producing a reference document by inserting at least a portion of the code of the at least one client library into the documentation template.

16. The non-transitory computer-readable medium set forth in claim 12, further comprising program code for capturing a wiretrace by recording data sent to the data service and data received from the data service while the test case is evaluated and caused by executing the test code.

17. A computing system comprising:
at least one processing device; and
a non-transitory computer-readable medium communicatively connected to the at least one processing device,
wherein the at least one processing device is configured to execute program stored in the non-transitory computer-readable medium and thereby perform operations comprising:
accessing data defining an application programming interface for a data service,
identifying a test case for a service call specified by the application programming interface based on the data defining the application programming interface, wherein the test case comprises a plurality of required parameters for the service call,
identifying an additional test case for the service call, wherein the additional test case comprises a subset of parameters that includes fewer than all of the plurality of required parameters for the service call,
automatically generating test code from code in at least one client library, the test code including at least one function for evaluating the identified test case by making the service call using the plurality of required parameters and code for evaluating the additional test case by executing the at least one function using the subset of parameters, automatically evaluating the identified test case, wherein evaluating comprises executing the at least one function in the test code and storing test results in a non-transitory computer-readable medium, and updating the code in the at least one client library that corresponds to the test code based at least in part on the test results from evaluating the identified test case.

18. The computing system of claim 17, wherein the test case is identified and the test code is automatically generated in response to detecting a change to the data defining the application programming interface.

19. The computing system of claim 17, wherein generating the test code further comprises generating test user account information that corresponds to the test case.

20. The computing system of claim 19, wherein the operations further comprise removing the test user account information that corresponds to the test case in response to completing evaluation of the test case.

\* \* \* \* \*

UNITED STATES PATENT AND TRADEMARK OFFICE
CERTIFICATE OF CORRECTION

| | |
|---|---|
| PATENT NO. | : 8,949,792 B2 |
| APPLICATION NO. | : 12/542893 |
| DATED | : February 3, 2015 |
| INVENTOR(S) | : Ian Paterson, Richard McMahon and James Boag |

Page 1 of 1

It is certified that error appears in the above-identified patent and that said Letters Patent is hereby corrected as shown below:

In the Claims

Column 13, Claim 12, Line 57

Delete "computerreadable"

Insert --computer-readable--

Signed and Sealed this
Second Day of June, 2015

Michelle K. Lee
*Director of the United States Patent and Trademark Office*